United States Patent [19]

Wu

[11] 3,885,928
[45] May 27, 1975

[54] ACRYLONITRILE AND METHACRYLONITRILE RECOVERY AND PURIFICATION SYSTEM

[75] Inventor: Hsin Chih Wu, Parma, Ohio

[73] Assignee: The Standard Oil Company, Cleveland, Ohio

[22] Filed: June 18, 1973

[21] Appl. No.: 371,043

[52] U.S. Cl. .......................................... 55/85; 55/89
[51] Int. Cl. ............................................ B01d 47/02
[58] Field of Search ...................... 55/82, 85, 89, 70

[56] References Cited
UNITED STATES PATENTS

| | | | |
|---|---|---|---|
| 3,005,517 | 10/1961 | Idol et al. | 55/70 |
| 3,299,618 | 1/1967 | Kunze et al. | 55/89 X |
| 3,315,442 | 4/1967 | Yuan et al. | 55/82 X |

Primary Examiner—John Adee
Attorney, Agent, or Firm—Herbert D. Knudsen

[57] ABSTRACT

In the recovery and purification of acrylonitrile or methacrylonitrile obtained by the ammoxidation of propylene or isobutylene, the aqueous layer of the decanter associated with the column removing HCN from the nitrile is recycled to the quench column wherein the hot gases from the reactor are directly contacted with the aqueous recycle stream.

6 Claims, 1 Drawing Figure

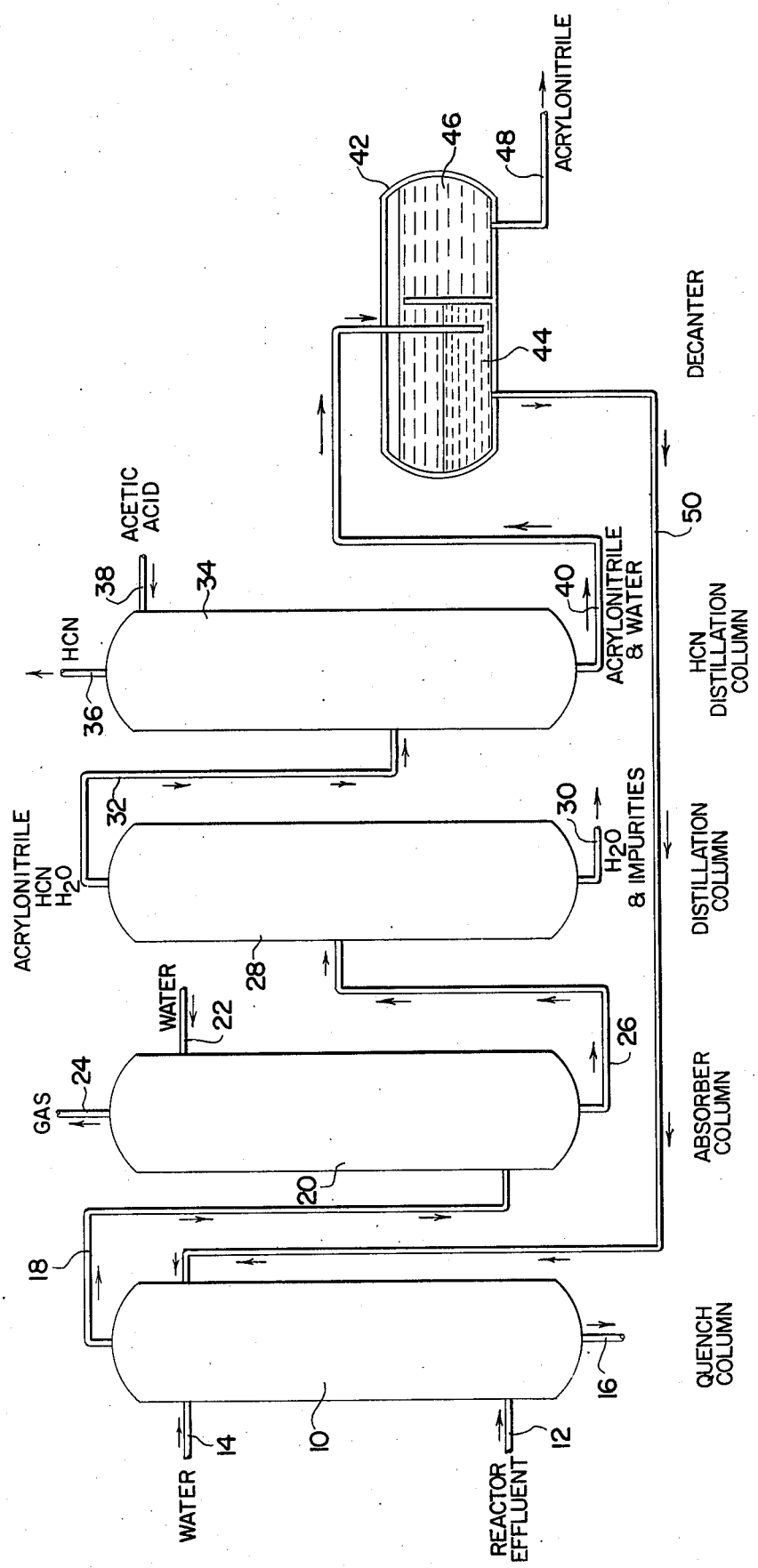

ACRYLONITRILE AND METHACRYLONITRILE RECOVERY AND PURIFICATION SYSTEM

SUMMARY OF THE INVENTION

It has now been discovered in the process for the recovery and purification of acrylonitrile or methacrylonitrile obtained by the ammoxidation of propylene or isobutylene wherein a. the reactor effluent is directly contacted with an aqueous stream to cool the gases in a quench column;

b. the acrylonitrile and HCN are recovered in the form of an aqueous solution;

c. some of the water and impurities are removed by distillation to form a concentrated aqueous mixture of acrylonitrile and HCN;

d. the aqueous mixture of acrylonitrile and HCN is distilled in an HCN distillation column to remove the HCN in an overhead stream; and e. the bottoms or a side stream in the HCN distillation column are fed to a decanter where an aqueous layer and an organic layer are formed, the improvement comprising removing the aqueous layer from the decanter and recycling the aqueous layer to the quench column.

The present invention provides a convenient method of disposing of an aqueous stream containing acrylonitrile that recovers the acrylonitrile, that substantially reduces the amount of acid required to neutralize the excess ammonia breaking through in the reactor effluent and that reduces the acidity in other areas of the recovery and purification system.

The invention is best understood by reference to the drawing.

DESCRIPTION OF THE DRAWING

The FIGURE is a schematic representation of the present invention as applied to acrylonitrile.

The reactor effluent is passed into the quench column 10 through line 12. An aqueous spray is contacted with the hot reaction gases, through line 14 to cool the gases. Sulfuric acid is also added through a line not shown to neutralize the ammonia in the reactor effluent. Liquid bottoms from the quench column are taken from the quench column through line 16. The overhead through line 18 passes the acrylonitrile and impurities to the absorber 20. In the absorber the acrylonitrile and water suluble impurities are absorbed in water from line 22. The non-absorbed gases pass through line 24. The aqueous stream containing acrylonitrile, HCN and water soluble impurities is passed through line 26 to a distillation column 28. In distillation column 28, distillation or extractive distillation is conducted to remove a bottoms stream of water and impurities through line 30. The overhead passing through line 32 consists essentially of acrylonitrile, HCN and water.

In HCN distillation column 34, distillation is conducted to remove HCN overhead through line 36. Some acetic acid or other acid is fed through line 38 to stabilize the HCN. The bottoms consisting essentially of acrylonitrile and water along with some acid is cooled and conducted through line 40 to the decanter 42.

In the decanter 42, the aqueous acrylonitrile is allowed to settle into an aqueous layer 44 and an organic layer 46. Organic layer contains acrylonitrile and is taken through line 48 to further purification. The aqueous layer consists essentially of water, dissolved acrylonitrile and dissolved acetic acid.

The present invention deals with the recycle of aqueous layer 44.

Aqueous layer 44 according to the present invention is recycled to the quench column 10 through line 50. In the quench column, the recycle liquid is directly contacted with the reaction gases. This recycle line assists in the cooling of the reactor effluent and the dissolved acetic acid in the aqueous decanter recycle neutralizes at least some of the ammonia coming into the quench column 10 from the reactor effluent. Thus, the amount of sulfuric acid required to neutralize the reactor is reduced.

DESCRIPTION OF THE PREFERRED EMBODIMENTS

The invention can be applied to any recovery and purification for acrylonitrile or methacrylonitrile that has a) a quench column where the reactor effluent is directly contacted with a liquid, usually an aqueous stream, and b) an HCN distillation column wherein HCN is separated from the nitrile. The intermediate steps associated with the recovery and purification are not critical.

The quench column is a device for contacting the hot gases of the reactor effluent directly with a liquid, usually in a counter-current flow of an aqueous stream and reaction gases. These columns are known in the art.

The second critical column of the invention is the HCN distillation column. In the HCN distillation column, the HCN is separated from the acrylonitrile or methacrylonitrile. The HCN is taken off as an overhead stream which is stabilized with an acid. Although any acid could be used for the stabilization, organic acids such as acetic acid are preferred.

The stream fed to the decanter is obtained from the HCN distillation column. The stream is either the bottoms of the column or a side stream. The side stream could be either liquid or vapor. The vapor stream, of course, must be condensed prior to being fed to the decanter. Each of these streams is cooled to a point where phase separation can take place. In the decanter, then, there is formed an aqueous phase and an organic phase.

The organic phase from the decanter is treated differently when a side stream is employed as compared to the use of a bottoms stream. As discussed above for a bottoms stream, the organic phase from the decanter is sent to subsequent purification steps. When a side stream is employed, the organic phase of the decanter is normally returned to the HCN distillation column for further processing.

As noted, the invention is the recycle of the aqueous phase of the HCN distillation column decanter to the quench column.

The recycle stream can be returned to the quench column at any point in the broad concept of the invention. In a preferred embodiment of the invention, the recycle stream is contacted with the hot reaction gases either as a separate spray or as a combined stream with the normal liquid flow of the quench column.

The processing steps between the quench column and the HCN distillation column are not critical in the invention. As noted, there is usually the absorption or condensation of the reactor effluent to form a stream containing the nitrile, HCN and water, and the distillation of the aqueous stream formed to concentrate the nitrile and HCN in the overhead. This overhead stream then goes to the HCN distillation column. Variations in these intermediate steps are certainly acceptable.

Thus, by use of the present invention, very desirable improvements in pH balance and considerable reductions in the use of neutralizing acid are realized.

I claim:

1. In the process for the recovery and purification of acrylonitrile or methacrylonitrile obtained by the ammoxidation of propylene or isobutylene wherein
   a. the reactor effluent is directly contacted with an aqueous stream to cool the gases in a quench column;
   b. the acrylonitrile and HCN are recovered in the form of an aqueous solution;
   c. some of the water and impurities are removed by distillation to form a concentrated aqueous mixture of acrylonitrile and HCN;
   d. the aqueous mixture of acrylonitrile and HCN is distilled in an HCN distillation column to remove the HCN in an overhead stream; and
   e. a side stream in the HCN distillation column are fed to a decanter where an aqueous layer and an organic layer are formed, the improvement comprising removing the aqueous layer from the decanter and recycling the aqueous layer to the quench column where it is directly contacted with the reactor effluent.

2. The process of claim 1 wherein the HCN in the HCN distillation column is stabilized with acetic acid.

3. The process of claim 1 wherein acrylonitrile is recovered and purified.

4. In the process for the recovery and purification of acrylonitrile or methacrylonitrile obtained by the ammoxidation of propylene or isobutylene wherein
   a. the reactor effluent is directly contacted with an aqueous stream to cool the gases in a quench column;
   b. the acrylonitrile and HCN are recovered in the form of an aqueous solution;
   c. some of the water and impurities are removed by distillation to form a concentrated aqueous mixture of acrylonitrile and HCN;
   d. the aqueous mixture of acrylonitrile and HCN is distilled in an HCN distillation column to remove the HCN in an overhead stream; and
   e. the bottoms in the HCN distillation column are fed to a decanter where an aqueous layer and an organic layer are formed, the improvement comprising removing the aqueous layer from the decanter and recycling the aqueous layer to the quench column where it is directly contacted with the reactor effluent.

5. The process of claim 4 wherein the HCN in the HCN distillation column is stabilized with acetic acid.

6. The process of claim 4 wherein acrylonitrile is recovered and purified.

* * * * *